United States Patent
Sayag

[11] Patent Number: 6,166,370
[45] Date of Patent: *Dec. 26, 2000

[54] METHOD AND APPARATUS FOR GENERATING A CONTROL SIGNAL

[75] Inventor: Michel Sayag, 1820 Hackett Ave., Mountain View, Calif. 94043

[73] Assignee: Michel Sayag, Mountain View, Calif.

[ * ] Notice: This patent is subject to a terminal disclaimer.

[21] Appl. No.: 09/007,276

[22] Filed: Jan. 14, 1998

Related U.S. Application Data

[63] Continuation of application No. 08/692,831, Jul. 30, 1996, Pat. No. 5,801,681, which is a continuation-in-part of application No. 08/669,651, Jun. 24, 1996, abandoned
[60] Provisional application No. 60/017,872, Apr. 30, 1996.

[51] Int. Cl.$^7$ .............................. G09G 1/00; G09G 3/00; G09G 5/08
[52] U.S. Cl. .......................... 250/221; 345/157; 345/176; 382/127
[58] Field of Search ................................. 250/208.1, 221, 250/222.1, 208.2, 208.3, 208.4, 208.5, 208.6, 227.13, 227.14, 239, 216, 214.1, 214 R; 356/400; 345/156, 157, 158, 161, 163, 166, 173, 177, 179; 382/115, 116, 119, 124, 125, 126, 127

[56] References Cited

U.S. PATENT DOCUMENTS

| | | | |
|---|---|---|---|
| 3,936,712 | 2/1976 | Gerber et al. | 318/568 |
| 4,093,872 | 6/1978 | Hartman et al. | 307/221 |
| 4,254,333 | 3/1981 | Bergström | 250/221 |
| 4,533,827 | 8/1985 | Fincher | 250/211 |
| 4,641,350 | 2/1987 | Bunn | 382/4 |
| 4,658,303 | 4/1987 | Nagano | 358/294 |
| 4,690,554 | 9/1987 | Froelich | 356/71 |
| 4,784,484 | 11/1988 | Jensen | 356/71 |
| 4,812,833 | 3/1989 | Shimauchi | 340/712 |
| 4,854,688 | 8/1989 | Hayford et al. | 350/571 |
| 4,896,363 | 1/1990 | Taylor et al. | 382/5 |
| 4,914,624 | 4/1990 | Dunthorn | 364/900 |
| 4,977,601 | 12/1990 | Bicz | 382/4 |
| 5,065,146 | 11/1991 | Garrett | 340/709 |
| 5,103,085 | 4/1992 | Zimmerman | 250/221 |
| 5,103,486 | 4/1992 | Grippi | 382/4 |
| 5,131,038 | 7/1992 | Puhl et al. | 380/23 |
| 5,148,015 | 9/1992 | Dolan | 250/221 |
| 5,177,802 | 1/1993 | Fujimoto et al. | 382/4 |
| 5,194,105 | 3/1993 | Nguyen | 156/293 |
| 5,210,588 | 5/1993 | Lee | 356/71 |
| 5,229,764 | 7/1993 | Matchett et al. | 340/825.34 |
| 5,239,166 | 8/1993 | Graves | 235/380 |
| 5,280,527 | 1/1994 | Gullman et al. | 380/23 |
| 5,311,611 | 5/1994 | Migliaccio | 385/120 |
| 5,337,043 | 8/1994 | Gokcebay | 340/825.31 |
| 5,355,148 | 10/1994 | Anderson | 345/166 |
| 5,453,606 | 9/1995 | Hojo | 250/201.1 |
| 5,467,403 | 11/1995 | Fishbine et al. | 382/116 |
| 5,508,719 | 4/1996 | Gervais | 345/157 |
| 5,532,476 | 7/1996 | Mikan | 250/221 |
| 5,538,691 | 7/1996 | Tosa et al. | 422/102 |
| 5,546,471 | 8/1996 | Merjanian | 382/124 |
| 5,553,019 | 9/1996 | Sandvos et al. | 365/185.04 |
| 5,577,848 | 11/1996 | Bowen | 400/472 |
| 5,578,817 | 11/1996 | Bidville et al. | 250/221 |
| 5,605,406 | 2/1997 | Bowen | 400/472 |
| 5,621,207 | 4/1997 | O'Mara | 250/221 |
| 5,623,553 | 4/1997 | Sekiya | 382/127 |
| 5,801,681 | 8/1998 | Sayag | 345/157 |

*Primary Examiner*—John R. Lee
*Attorney, Agent, or Firm*—Beyer Weaver & Thomas, LLP

[57] ABSTRACT

A method and apparatus for generating a control signal which corresponds to movement of an object in contact with a first surface are described. The apparatus includes a platen having the first surface. The platen is characterized by a critical angle beyond which light incident upon the first surface is not transmitted. A source of electromagnetic radiation emits electromagnetic radiation through the platen thereby illuminating the object. A detector having a plurality of sectors receives a portion of the electromagnetic radiation diffused by the object and transmitted through the platen beyond the critical angle. The sectors of the detector accumulate charge in response to the incident electromagnetic radiation. Conversion circuitry then converts the charge accumulated in the detector to the control signal, which in a specific embodiment is for controlling the movement of a pointer on a display.

65 Claims, 11 Drawing Sheets

METHOD AND APPARATUS FOR GENERATING A CONTROL SIGNAL

RELATED APPLICATION DATA

This application is a continuation application of U.S. patent application Ser. No. 08/692,831 filed Jul. 30, 1996, now U.S. Pat. No. 5,801,681, which is a continuation-in-part of U.S. patent application Ser. No. 08/669,651 filed on Jun. 24, 1996, now abandoned, which is a nonprovisional application claiming priority from U.S. Provisional Application Ser. No. 60/017,872 filed on May 14, 1996.

BACKGROUND OF THE INVENTION

The present invention provides a device which optically senses the presence and movement of an object in contact with an optically transmissive platen and generates a control signal indicative thereof. According to a specific embodiment of the invention, the control signal is for controlling the movement of a pointer or cursor on a display. According to another specific embodiment, the control signal is for controlling various functions of an apparatus such as, for example, volume and channel selection on a television.

There are currently a number of different technologies on the market for moving a pointer on a computer display screen, the most common being a "mouse". The mouse employs a rubber ball in frictional contact with a flat surface. The rotation of the rubber ball caused by movement of the mouse across the surface is translated into movement of the pointer on the screen. Typically, the rotation of the ball is sensed using two wheels in contact with the ball, each of which tracks rotation of the ball in one dimension. The wheels generate electrical signals which are, in turn, combined to generate a composite signal for controlling movement of the pointer on the screen in the two dimensions. Selection of symbols or icons on the screen indicated by the pointer is effected by actuation of a switch on the mouse. Another type of mouse operates similarly to the typical mouse except that the rotation of the ball is tracked by optical sensors.

One alternative to the mouse is the Glidepoint pad manufactured by Alps Electronics. The Glidepoint is a touch sensitive pad which comprises a matrix of pressure sensitive switches across which the user moves a fingertip or other object such as, for example, a pencil. The matrix of switches tracks the movement of the fingertip across the surface of the pad and generates a two-dimensional control signal which controls the movement of the pointer. As with the mouse, a switch is provided for selection of items on the screen. Alternatively, selection may be effected by rapid, intermittent actuation of any portion of the switch matrix, i.e., tapping on the Glidepoint pad.

Another alternative to the mouse is the TrackPoint pointing stick provided by IBM with its Thinkpad line of laptop computers. The Trackpoint is essentially a miniature joystick which protrudes from the center of the laptop's keyboard. To move the pointer up and down, the user pushes the stick forward and backward. To move the pointer left and right, the user pushes the stick left and right. The Trackpoint senses the forces exerted against it, translating these forces into electrical signals corresponding to the directions in which the stick is pushed. These electrical signals are then used to control the movement of the pointer on the display.

In the field of television remote controls, control signals for volume control and channel selection are typically generated using mechanical switches. The control signals are then transmitted to the television using infrared energy. One type of remote control employs four mechanical momentary switches arranged in a diamond configuration with the left/right switches controlling channel selection and the up/down switches controlling the volume. Another type of remote control employs a four-position rocker switch (e.g., circular or cross-shaped) with similar functionality associated with the four positions.

The above-described pointing and remote control devices each have associated advantages for particular applications. However, all of them share the same disadvantage in that each includes components which require mechanical actuation to effect movement of the display pointer. Because of inherent reliability problems associated with mechanical components, pointing and control devices having no mechanical components are therefore desirable.

SUMMARY OF THE INVENTION

According to the invention a control device with no moving parts is provided for generating control signals for such applications as controlling movement of a pointer on a display, or, more generally, for controlling the various functions of an apparatus. The control device employs an optically transmissive platen upon which the user places a fingertip. From the opposite side of the platen, a light-emitting diode emits light through the platen which is diffused by the user's fingertip. A photodetector is disposed in such a manner as to only receive light diffused and/or reflected beyond the critical angle of the platen material. That is, the photodetector receives an image of an object, e.g., the fingertip, in contact with the platen and none of the ambient light because it cannot travel beyond the critical angle of the platen. According to some embodiments, a lens or system of lenses focuses the light from the fingertip onto the photodetector.

According to a specific embodiment, the photodetector is configured into quadrants, each of which receives a portion of the light corresponding to the fingertip image and generates charge in proportion to the amount received. That is, the light energy received in each quadrant and the resultant charge generation are a function of the contact area of the fingertip in the corresponding platen quadrant. Any slight motion of the fingertip on the platen affects the size, shape and location of the fingertip's contact area which is, in turn, tracked in substantially real time by corresponding changes in the charge generation in the photodetector quadrants. The charge generation and the changes therein caused by movement of the fingertip on the platen are then converted to a control signal which may be used, for example, to control movement of a pointer on a display screen. Because, in such an embodiment, each of the photodetector's quadrants corresponds to a particular pointer direction, the control signal combines information from the charge generated in each quadrant to determine the direction and speed of the pointer on the screen.

Therefore, by optically sensing minute movements of the user's fingertip on the platen using optical components, a control signal for the display pointer is generated without the use of mechanical components. Moreover, because inexpensive four quadrant photodetectors are commercially available, and because the other device components are inexpensive, the pointing device of the present invention may be manufactured at a very low unit cost.

According to another embodiment, a dual-mode control device is provided which employs a configurable matrix array as the detector. In one mode, the matrix array is biased so that it is divided into a plurality of multi-pixel sectors, each of which acts as a single photosensitive region from which stored charge can be downloaded in a single step. In this mode, the device acts like the control device described above. In the second mode, the matrix array is biased to act like a high resolution imaging device to capture a detailed image of the user's fingerprint.

Thus, according to the invention a method and apparatus for generating a control signal which corresponds to movement of an object in contact with a platen are described. The platen has a first surface and is characterized by a critical angle beyond which light incident upon the first surface is not transmitted. A source of electromagnetic radiation emits electromagnetic radiation through the platen which is diffused by the object. A detector having a plurality of sectors receives a portion of the electromagnetic radiation diffused by the object and transmitted through the platen beyond the critical angle. The sectors of the detector accumulate charge in response to the incident electromagnetic radiation. Conversion circuitry then converts the charge accumulated in the detector to the control signal.

According to a specific embodiment, the object comprises a fingertip and the control signal is for controlling movement of a pointer on a display in response to the movement of the fingertip on the platen. In this embodiment, the charge is converted to a digital serial signal compatible with a computer serial data port, e.g., a mouse port. In a more specific embodiment, a selection signal may be generated for selecting an item on the display indicated by the pointer. The selection signal is generated in response to a sequence of intermittent contacts between the fingertip and the platen.

According to another specific embodiment, the control signal is initialized for the initial position of the fingertip on the platen such that movement of the pointer does not occur when the fingertip is in the initial position. The control signal is reinitialized in this way each time the fingertip is removed from the platen and replaced thereon.

According to yet another specific embodiment, the control signal is generated by a television remote control device and may be used to control a variety of television functions such as, for example, volume and channel selection. In one embodiment, each of the sectors of the detector corresponds to a television remote control function with opposite sectors controlling opposing functions. For example, in a four sector embodiment, the right and left sectors may represent channel up and down, respectively, while the up and down sectors may represent volume up and down, respectively. The charge generation distribution in the detector indicates the selected function, the control signal for which is then transmitted to the television.

In a more specific embodiment of a television remote control device, the present invention may be employed as a parental lock device to prevent children from watching particular restricted channels. In addition to the volume and channel switch emulation described above, the invention operates in a mode which allows or denies access to restricted channels based on a particular characteristic, e.g., the size, of the fingertip on the platen. To gain access to a restricted channel, the fingertip is placed in the center of the platen and the strength of the signal from the detector is measured to determine whether the size of the fingertip exceeds some threshold. Alternatively, if an imaging array is used, the size of the fingertip can be accurately measured. The child/adult threshold may be preset in the factory, but the user, i.e., the parent, should be able to reset the threshold in the home to more closely correspond to the actual fingertips likely to use the device. This could be done by registering the fingertips of the parents and children. According to another embodiment, the fingerprint capture capabilities of the present invention may be employed to control access to restricted channels. Thus, the present invention provides an effective parental channel lock device which does not require modification of the television set as would be the case for the highly publicized "V-chip".

The above-described specific embodiments of the invention may each be implemented using either "dark field" or "bright field" configurations. A "dark field" configuration refers to a configuration in which the detector receives no light unless an object, e.g., a fingertip, is in contact with the platen. This is accomplished by orienting the radiation source and the detector in such a way that only light diffused by the object in contact with the surface impinges upon the detector.

Conversely, a "bright field" configuration refers to a configuration in which the detector is illuminated whenever the radiation source is on because the radiation source is oriented such that it illuminates the platen from beyond the critical angle and is totally reflected in the direction of the detector unless an object is in contact with the platen. When an object is in contact with the platen, the light impinging on the area of contact is diffused and the energy reaching the detector is correspondingly reduced. That is, the area of contact "appears" darker to the detector than the surrounding area of the platen. With either implementation, substantially the same information may be derived from charge generated by the detector through the use of appropriate signal polarity conversions.

A further understanding of the nature and advantages of the present invention may be realized by reference to the remaining portions of the specification and the drawings.

DESCRIPTION OF SPECIFIC EMBODIMENTS

Figure 1:
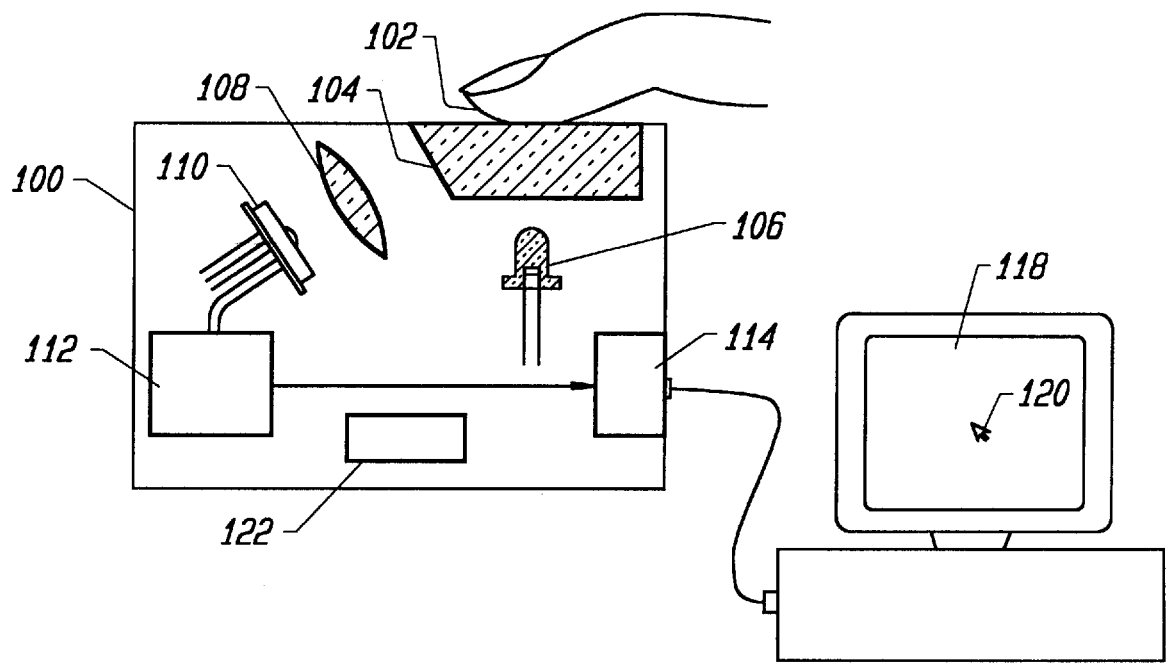
FIG. 1 is a simplified diagram of a specific embodiment of the pointing device of the present invention.

FIG. 1 is a simplified diagram of a pointing/control device 100 designed according to a specific embodiment of the present invention. A user's fingertip 102 is placed in contact with an optically transmissive platen 104 which is illuminated from the backside by light-emitting diode 106. Lens 108 and detector 110 are disposed in such a manner so as to receive light diffused by fingertip 102 beyond the critical angle of platen 104. Platen 104 supports the user's fingertip, creating a contact area between fingertip 102 and platen 104 which can be imaged, segmented into quadrants, and tracked. Lens 108 reduces the image size of fingertip 102 (typical 0.7"×0.7") to allow the use of a small and inexpensive photodetector. In a specific embodiment, the image size is reduced to approximately 0.05"×0.05". According to one embodiment, detector 110 is a quadcell photodetector which generates charge in each quadrant of the detector in proportion to the contact area imaged in each quadrant, thus tracking movement of fingertip 102 on platen 104 in substantially real time. In various specific embodiments, detector 110 is a silicon four quadrant photodiode such as the SFH244 S manufactured by Siemens, and LED 108 is a superbright T1¾ LED lamp such as the LS 5421 also manufactured by Siemens.

In a specific embodiment of the invention, platen 104 comprises an injection molded plastic housing which also serves as lens 108, and with which LED 106 and detector 110 are fully integrated. In a more specific embodiment, pointing device 100 includes analog-to-digital converter 112 and serial data interface 114 for facilitating compatibility with a computer serial data port, e.g., a mouse port. In a still more specific embodiment, analog-to-digital converter 112 and serial data interface 114 are incorporated on the same silicon chip as detector 110 to reduce the number of parts necessary to interface pointing device 100 with a computer.

According to a specific embodiment, the frequency at which the detector output is measured and transmitted to the display is high enough to avoid any visible latency between the motion of the fingertip and the motion of the pointer. Moreover, the frequency is set to allow the computer to monitor intermittent contacts between the fingertip and the platen, i.e., tapping, for use in generating a selection signal. According to one embodiment, the measurement frequency is set at 60 Hz. The selection signal is used for selecting an item on display 118 indicated by pointer 120.

Use of this "optical click button" feature is analogous to "double clicking" a mouse button and may provide similar functionality as that provided by a variety of currently available mouse buttons. In a more specific embodiment, an electro-acoustic device 122 is provided in pointing device 100 to simulate the clicking sound of a conventional mouse button.

Figure 2:
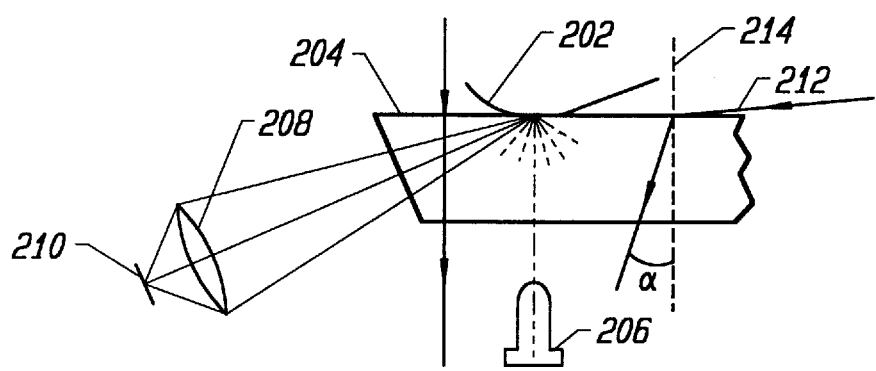
FIG. 2 is a simplified diagram of a specific embodiment of the invention illustrating the diffusion of light by a fingertip in contact with the platen.
Figure 3:
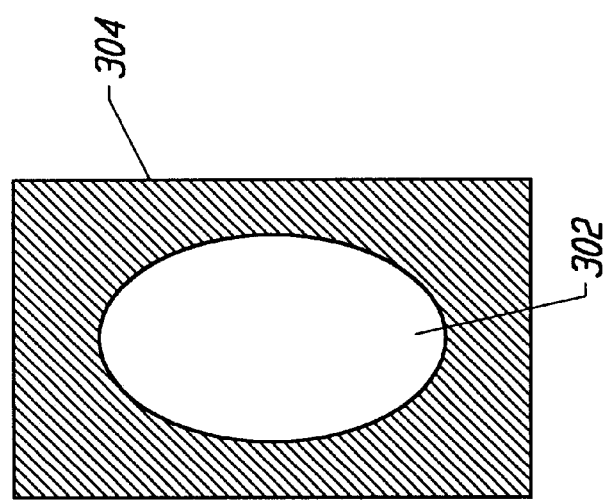
FIG. 3 is a representation of the image received by the pointing device's detector according to a specific embodiment of the invention.

FIG. 2 is a simplified diagram of a specific embodiment of the invention illustrating the diffusion of light by a fingertip 202 in contact with a platen 204. An LED 206 emits light through platen 204 which is diffused by fingertip 202, transmitted by lens 208 and received by detector 210. The critical angle α of platen 204 may be understood with respect to a grazing incident light ray 212 which is nearly parallel to the surface of platen 204. Due to the refractive index of the platen material, light ray 212 is transmitted through platen 204 at a different angle than the angle of incidence. As the angle of incidence approaches 90 degrees, the angle between light ray 212 (inside platen 204) and the platen normal 214 approaches α, the critical angle. The critical angle is dependent upon the index of the platen material and is given by the Snell formula, sin α=1/n, where n is the index of the platen. As can be seen from the figure, lens 208 and detector 210 are placed such that they cannot receive even grazing incident light. That is, they are placed beyond the critical angle. FIG. 3 is a representation of the image received by detector 210 which consists only of light corresponding to contact area 302 and none from the surrounding area 304, i.e., the "dark field" implementation.

Figure 4B:
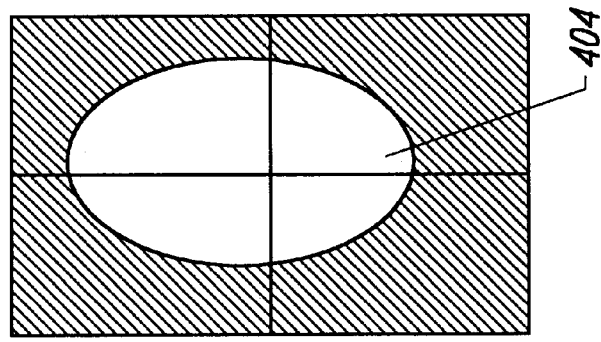
FIGS. 4A and 4B are representations of the received image superimposed over a grid representing the four quadrants of the pointing device's detector according to a specific embodiment of the invention.
Figure 4A:
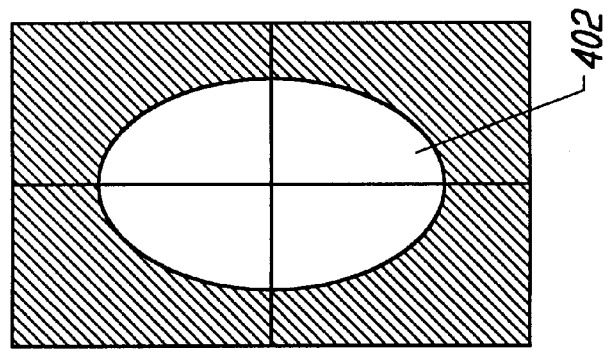

FIGS. 4A and 4B are representations of fingertip contact areas 402 and 404 superimposed over a grid representing the four quadrants of the detector of a pointing device designed according to a specific embodiment of the invention. FIG. 4A shows the initial position of the fingertip represented by contact area 402. Each time a fingertip first comes into contact with the pointing device platen, the device is initialized such that the charge distribution generated by the device's detector represents the zero position of the display pointer, i.e., the initial contact area does not move the pointer, and all subsequent motion of the pointer is determined with reference to this initial contact area. FIG. 4B shows a contact area 404 which is displaced from initial contact area 402 in the direction of the upper right quadrant. Such a movement of the fingertip contact area corresponds to movement of the pointer on the display in the direction of the upper right corner of the display.

According to a specific embodiment, the magnitude of the motion of the fingertip sets the speed of the pointer rather than the actual displacement of the pointer on the display, i.e., the greater the motion, the greater the speed. The pointer will continue to move across the display with the speed and direction set by this motion as long as the fingertip remains motionless. The pointer direction and speed changes in response to any new motion of the fingertip. The pointer comes to a stop when the fingertip is removed from the platen.

Figure 5:
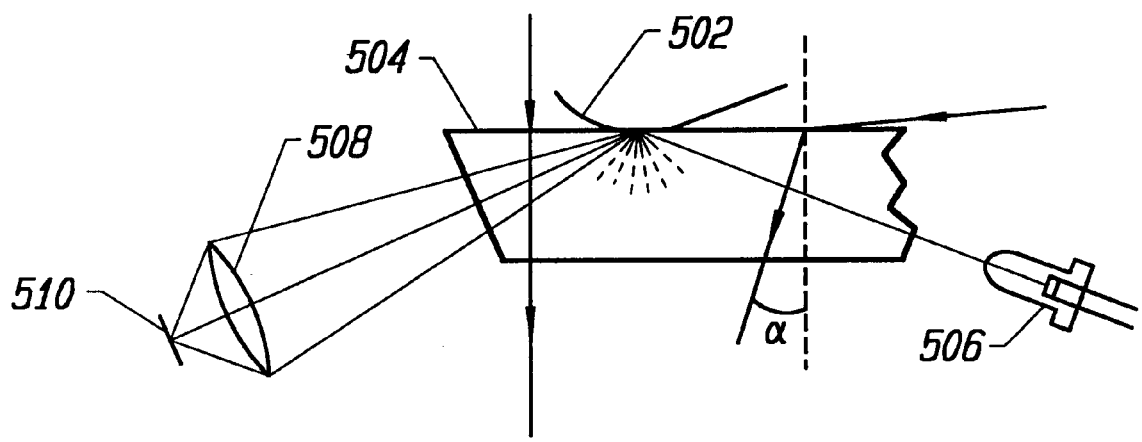
FIG. 5 is a simplified diagram of another specific embodiment of the invention illustrating the diffusion of light by a fingertip in contact with the platen.
Figure 6:
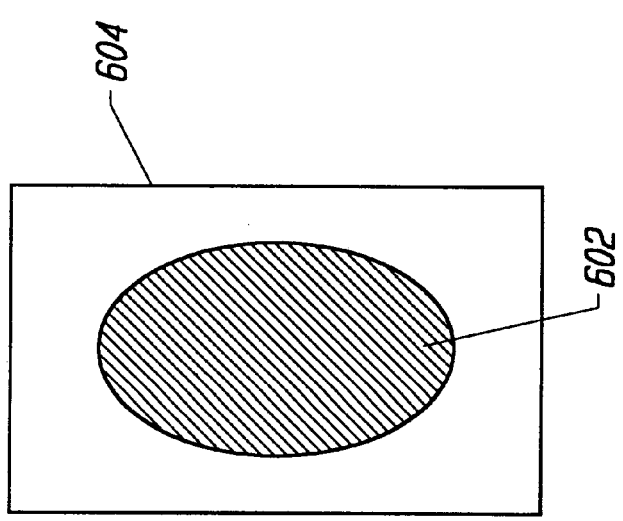
FIG. 6 is a representation of the image received by the pointing device's detector according to a specific embodiment of the invention.

FIG. 5 is a simplified diagram of another specific embodiment of the invention illustrating the diffusion of light by a fingertip 502 in contact with a platen 504. An LED 506 emits light through platen 504 from beyond the critical angle α which is both reflected from the upper surface of platen 504 and diffused by fingertip 502. The reflected and diffused light energy is then transmitted by lens 508 and received by detector 510. FIG. 6 is a representation of the image received by detector 510 in which the light energy corresponding to contact area 602 is diminished (i.e., frustrated total internal reflection) with respect to the surrounding area 604, i.e., the "bright field" implementation.

Figure 7B:
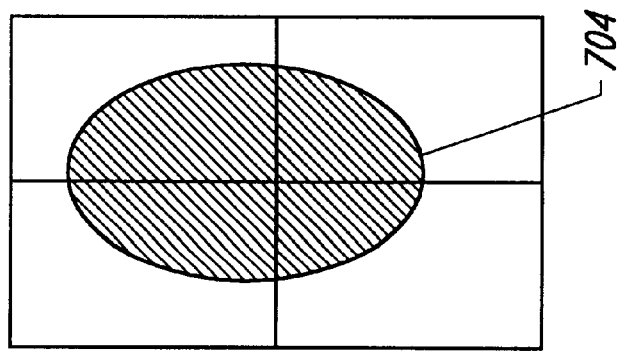
FIGS. 7A and 7B are representations of the received image superimposed over a grid representing the four quadrants of the pointing device's detector according to a specific embodiment of the invention.
Figure 7A:
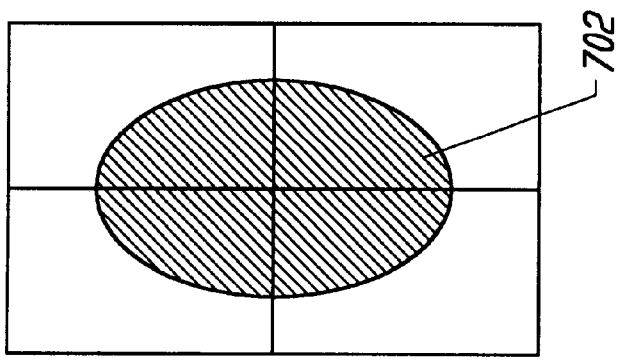

FIGS. 7A and 7B are representations of fingertip contact areas 702 and 704 superimposed over a grid representing the four quadrants of the detector of a pointing device designed according to a specific "bright field" embodiment of the invention. FIG. 7A shows the initial position of the fingertip represented by contact area 702. As with the "dark field"

embodiment described above, each time a fingertip first comes into contact with the platen, the device is initialized such that the charge distribution generated by the device's detector represents the zero position of the display pointer, i.e., the initial contact area does not move the pointer, and all subsequent motion of the pointer is determined with reference to this initial contact area. FIG. 7B shows a contact area 704 which is displaced from initial contact area 702 in the direction of the upper right quadrant. Such a movement of the fingertip contact area corresponds to movement of the pointer on the display in the direction of the upper right corner of the display.

Figure 8:
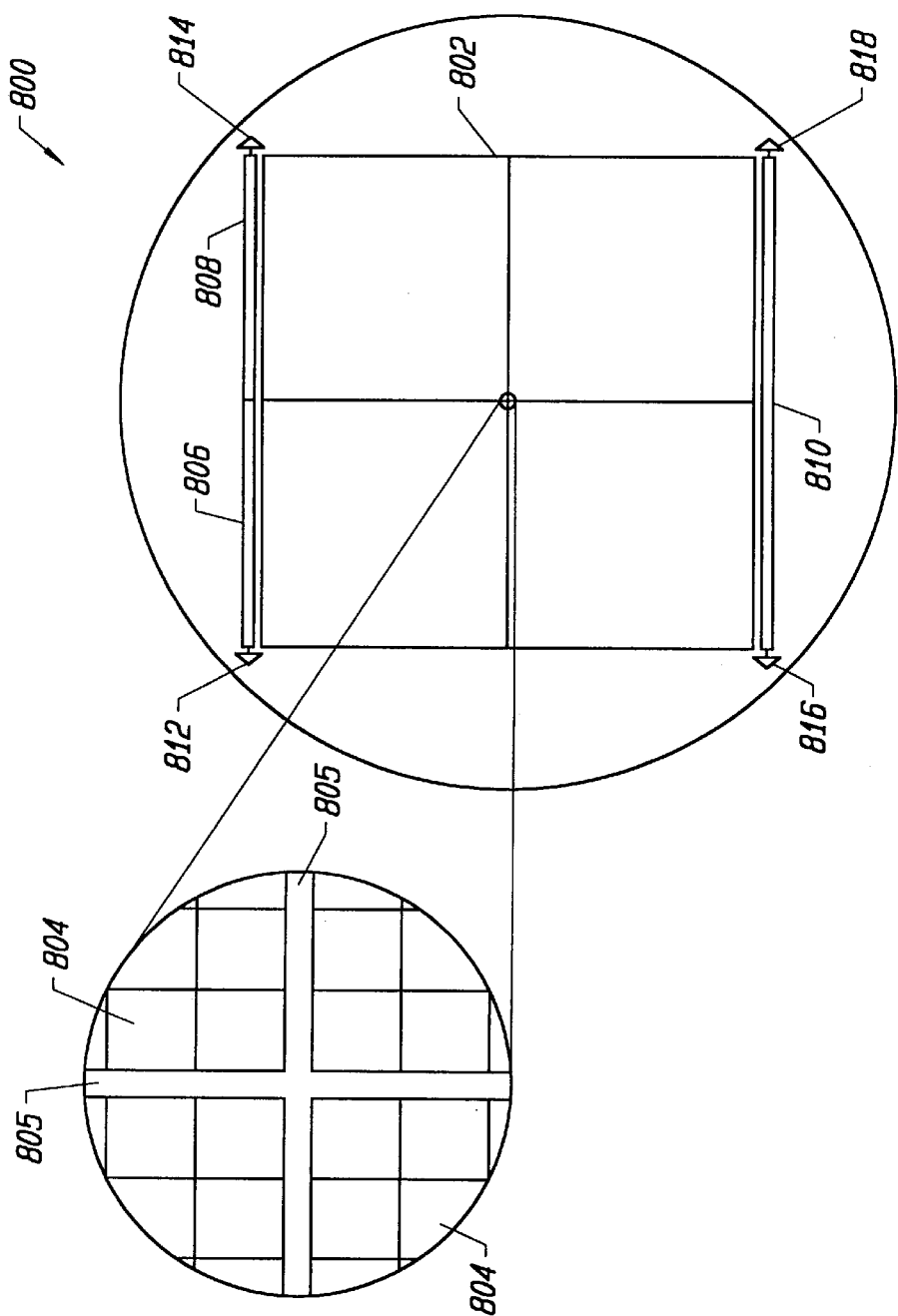
FIG. 8 is a simplified diagram of a configurable detector array designed according to a specific embodiment of the invention.

FIG. 8 is a simplified diagram of a detector 800 having a configurable matrix array 802 for use with a specific embodiment of the present invention. The enhanced resolution of detector 800, as compared to the quadcell detector, allows a pointing device employing detector 800 to achieve not only finer pointing accuracy, but also a dual-mode operation in which the pointing device captures the coarse image of the fingertip for pointing purposes, and the detailed image of the fingertip for fingerprint identification and verification purposes.

Array 802 is divided into four quadrants, each of which comprises a plurality of photosensitive storage regions or pixels 804 arranged in rows as shown in the magnified portion of the figure. The upper pair of quadrants and the lower pair of quadrants are each controlled by an independent multi-phase clock such that the charge accumulated in the upper quadrants may be downloaded independently from the charge accumulated in the lower quadrants using one of several well known multi-phase charge shifting techniques. In addition, the independent multi-phase clocks may be operated in synchronism with each other, thereby simulating a single multi-phase clock for the entire array 802.

Alternatively, each quadrant of array 802 can be biased to create a single photosensitive region which can be read out entirely without any clocking or binning of pixels 804. This is made possible by barriers 805 which isolate the quadrants from each other, and by the fact that all of the phases of the multi-phase clocks may be held at the same potential simultaneously, thereby creating a single photosensitive region in each quadrant bounded by barriers 805. According to various embodiments, barriers 805 may be, for example, embedded or voltage controlled.

Also included in detector 800 are shift registers 806, 808 and 810. When charge from the upper and lower quadrants is downloaded independently, shift registers 806 and 808 receive charge downloaded from the upper left and upper right quadrants, respectively. Shift registers 806 and 808 each have their own output (outputs 812 and 814, respectively). Shift register 810 may be operated as two separate shift registers like 806 and 808, in which case, the left half of shift register 810 receives charge downloaded from the lower left quadrant and the right half from the lower right quadrant. Alternatively, when the multi-phase clocks controlling array 802 are synchronized, shift register 810 acts as a single shift register receiving charge downloaded from the entire array. In general, this is done one row at a time. However, it will be understood that more than one row may be binned and read out serially via register 810 depending upon the desired resolution of the captured image.

These different modes of operation are possible not only because of the flexible operation of the clocks, but because each half of shift register 810 is also controlled by an independent multi-phase clock. In a first mode, this enables charge to be simultaneously shifted in opposite directions in the two different halves of register 810 toward different outputs 816 and 818. In a second mode, the shift register clocks are synchronized, thereby allowing charge to be shifted out of register 810 in one direction toward only one of the outputs (e.g., output 818).

In the first mode, the pointing device mode, all of the phases of the multi-phase clocks controlling the array are held at the same potential (except for center gates) and charge is periodically generated when the LED is on and then read out via the four separate outputs of shift registers 806, 808 and 810, one output for each of the quadrants. Thus, because each of the quadrants of array 802 can act as a single charge generating element, a four region operation is achieved which is similar to that described above with regard to the simple four element detector.

In the second mode, the image capture mode, the multi-phase clocks are synchronized to simulate one multi-phase clock for the entire array and all of the pixels are used for capturing a high resolution image. According to one embodiment, array 802 comprises 256×256 pixels 804. In this mode, the charge in each row of pixels is downloaded one row at a time into register 810 and shifted out serially via output 818. Because only light diffused beyond the critical angle reaches detector 800, the device of the present invention produces the contrast between the ridges and valleys of the fingertip necessary for high quality fingerprint capture. The user's fingerprint may be captured in this manner for a variety of purposes. For example, verification of the user's fingerprint by comparison to a stored sample could be used as a security measure to prevent unauthorized access to both hardware and electronically stored data. It will be understood that the possible applications of such an image capture mode are too numerous to discuss here but are nevertheless within the scope of the invention. It is important to note, however, that the present invention is particularly secure for fingerprint capture applications because of the fact that none of the ambient light, i.e., light from outside of the device, reaches the detector. Therefore, false fingerprint images cannot be projected onto the detector.

In the pointing device mode, the ability to configure array 802 to have quadrant sized photosensitive regions is important in that very low power dissipation is possible for this mode. This is particularly relevant in the laptop environment or for a remote control device in which precious battery resources must be carefully conserved. This point is easily understood with reference to a specific embodiment of the invention in which detector 800 comprises a charge-coupled device (CCD) having an array of 256×256 pixels, each of which is 5 $\mu$m square. In the imaging mode where each pixel is used to individually store a portion of an image, a typical pixel rate of 500 kHz might yield a power dissipation on the order of 800 mW; an unacceptably high rate in the laptop environment if detector 800 were to be used continuously in this mode.

In contrast, biasing the quadrant to form four large photosensitive regions eliminates the need for conventional clocking and binning of individual pixels. Detector 800 may therefore be operated at an extremely low rate, e.g., 50 Hz, with a duty cycle near 100% yielding a low power dissipation of 100 mW which favorably compares to the power dissipation of a typical quadcell detector, e.g., 50 mW. If, however, dual mode operation is not necessary or desirable, the lower power consumption and cost of the quadcell detector makes it a more appropriate candidate for such applications.

It will be understood that the dual mode capabilities of the present invention are also useful for consumer transactions via the internet and interactive television. Commercial activity over the internet and via interactive television has been slow to develop due, at least in part, to security concerns such as, for example, unauthorized credit card use. The secure and reliable fingerprint capture and validation capabilities provided by the present invention directly address and alleviate these concerns. Moreover, once a consumer has gained access to an interactive home shopping channel or the internet site of their choice, the pointing and control capabilities of the present invention may then be employed to "navigate", select options, control volume, etc. The possible applications in this and many other environments are virtually unlimited.

One specific embodiment of the present invention employs a configurable matrix array and a "dark field" configuration, and takes advantage of the fact that ambient light, i.e., light from outside the device, does not impinge upon the array to reduce the size of the array. Because the array is exposed only to light from the LED, the LED may be pulsed rather than on continuously, and the array may be a full frame architecture, i.e., an architecture in which substantially all of the array area is photosensitive, as opposed to a conventional interline or frame transfer architecture in which half of the array area is consumed by opaque charge storage sites. Existing fingerprint capture devices employ standard video image sensors which integrate and readout charge simultaneously using interline or frame transfer arrays. Such architectures are necessary for video applications in which light is continuously impinging on the array because they allow a frame to be integrated in the photosensitive sites while the previous frame is readout from the opaque sites. Unfortunately, a high price is paid in that the dimensions of interline or frame transfer arrays are effectively twice those of a full frame architecture with comparable resolution.

By contrast, according to the present invention, when the LED is on and an object is in contact with the platen, the array accumulates charge as, for example, previously described with reference to FIG. 8. The LED is periodically turned off to allow the charge in the array to be downloaded, during which time no light impinges on the array, obviating the need for opaque storage sites. The LED is controlled by a signal pulse which is synchronized with the integration phase of the array. The duration of the pulse width controls the amount of light energy impinging on the array and alleviates the need for any further complicated light adjustment. The readout can occur immediately after the LED has been turned off, and may be followed by another exposure if required, e.g., the first image did not capture a good fingerprint sample. Therefore, the ability to operate in a pulsed manner allows the use of an array which is considerably smaller (and less costly) than conventional interline or frame transfer arrays having comparable resolution. Moreover, the array may be employed for the substantially real time operation necessary for pointing and control functions by using a rapid succession of exposures and readouts.

The dimensions of the detector array may be further reduced according to another specific embodiment of the invention in which a modified two-phase clocking scheme is employed to read out charge from the array. Unlike standard two-phase clocking schemes, charge may be generated in the array, i.e., integration, and then read out using only two phases without mixing charge accumulated in adjacent lines. This technique reduces the number of clock phases required to move lines of charge individually from three to two, thereby reducing the number of gates per pixel from three to two, providing significant reductions in sensor dimensions.

Readout begins with the clocking of only the gates of the pixels in the first line in the array. After a delay of one clock cycle, the gates of the second line of pixels are connected to the two-phase clock. After another delay of one clock cycle, the gates of the third line of pixels are connected to the clock, and so on thereafter. That is, by inserting a one clock cycle delay between adjacent lines, sufficient separation is maintained between the adjacent lines of charge such that a two-phase clocking scheme may be employed without mixing of charge from any two adjacent lines. The sequential connection of the gates from each line of the array is implemented with a digital shift register.

Another specific embodiment employs the pointing mode of the image sensor to detect the presence of a fingertip on the platen and to thereby temporarily select the imaging mode for fingerprint capture. The image sensor does not have to operate in the imaging mode (i.e., the high power dissipation mode) on a continuous basis while the device is not in use, or after the user's fingerprint has been captured. Thus, the image sensor operates in the pointing mode (i.e., the low power dissipation mode) until a fingertip is detected on the platen at which point it automatically switches to the imaging mode. The imaging mode operation lasts only until an acceptable fingerprint image is captured and transferred to the computer. This feature greatly reduces the power dissipation and minimizes the amount of data transferred to the computer. The pointing mode of the image sensor is thus extended to a pointing/triggering mode.

Figure 9:
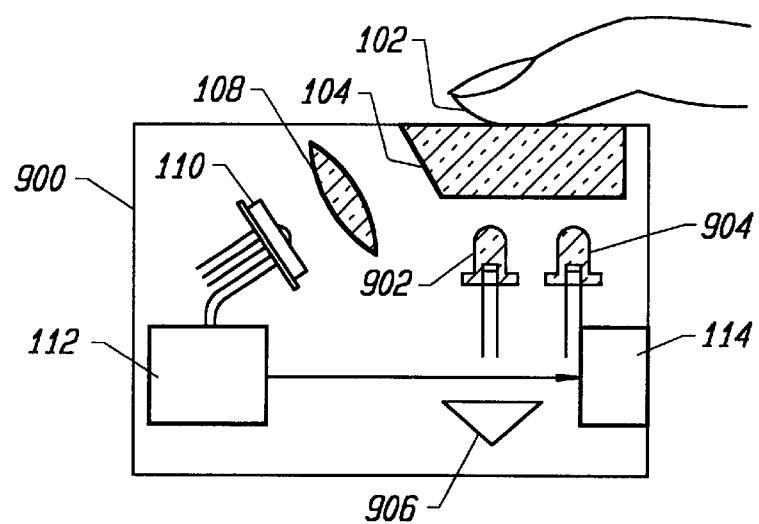
FIG. 9 is a simplified diagram of another specific embodiment of the pointing device of the present invention.

In a more specific embodiment of the invention shown in FIG. 9, a control device 900 employs one red and one green LED (902 and 904, respectively) to alternately illuminate the platen area. Device 900 has many features in common with control device 100 of FIG. 1 which are designated by the same reference numbers and will not be discussed here. During fingerprint capture, device 900 employs red LED 902 to illuminate fingertip 102. Once a satisfactory image of the fingerprint has been captured, red LED 902 is switched off and green LED 904 is switched on indicating to the user that she may remove her finger from the platen. Alternatively, green LED 904 may be employed to indicate that a fingerprint match has been detected. In some embodiments, the edges of the platen are beveled to enhance the visibility of the light from the LEDs.

Figure 10:
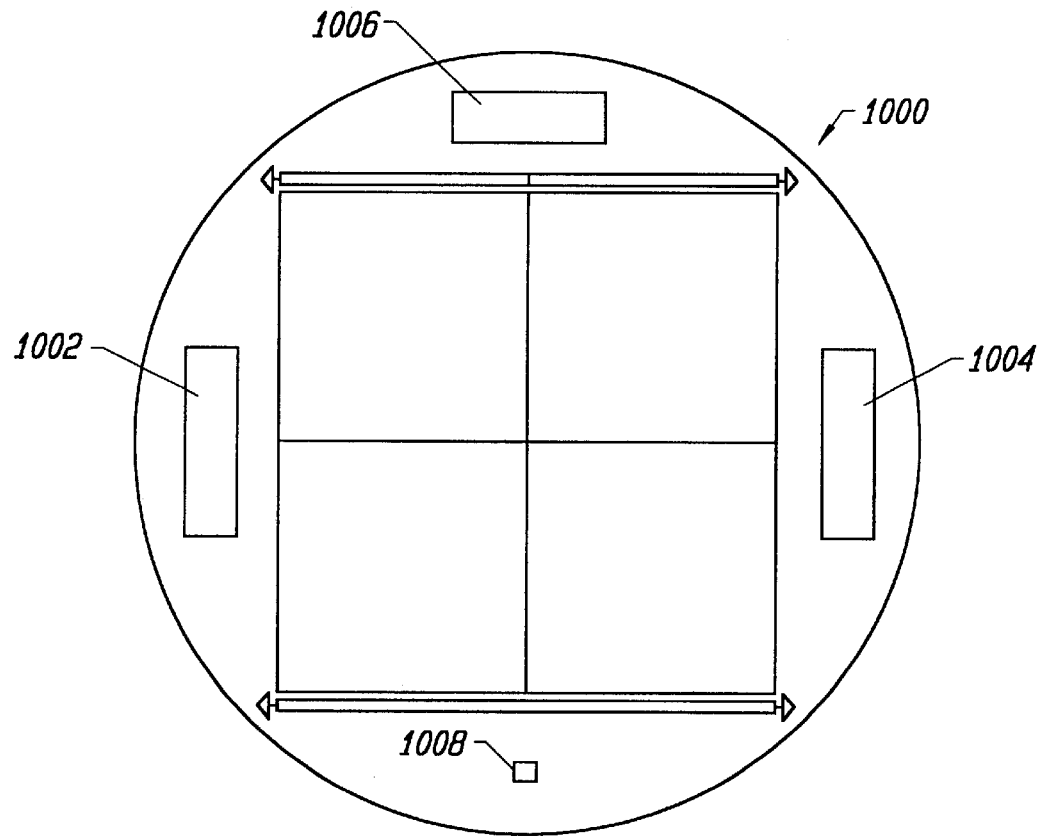
FIG. 10 is a simplified diagram of a detector array designed according to another specific embodiment of the invention.

Another specific embodiment shown in FIG. 10 includes a computer port interface 1002 fabricated on imaging sensor 1000 along with digital circuitry 1004 which is capable of encrypting the fingerprint image data captured by imaging sensor 1000. This feature is extremely valuable since it protects the fingerprint data integrity against tampering. Existing fingerprint capture devices either do not offer any encryption, or use different semiconductor components for image capture and for encryption. By including the image capture function and the encryption function on the same semiconductor chip, one can prevent tampering and thus achieve a high level of security.

Imaging sensor 1000 may also include digital circuitry 1006 which is capable of protecting software programs against piracy, illegal use and reverse engineering. This feature guarantees that protected software can only be run if digital circuitry 1006 is connected to the computer via computer port 1004 and responds appropriately to certain codes. Current commercially available systems offer similar protection with separate dedicated hardware (e.g., hardlock, dongle, software key). However, by integrating this function into the image sensor's circuitry, the number of system components is reduced thereby lowering system cost. Moreover, protection is provided for the fingerprint identification/recognition software because this feature ensures that the software can only be run with a legitimate image sensor. Finally, the integration of the circuitry on the sensor chip further reduces the risk of tampering because injecting external fingerprint data in the data path is made extremely difficult.

Another specific embodiment provides an external signal input 1008 on image sensor 1000 to allow certain functions (e.g., A/D conversion, computer interface) to be used for non-imaging purposes. Such purposes may include, for example, data collection from an ultrasonic sensor 906 placed in device 900 of FIG. 9 which is designed to verify that the object on the platen is a real fingertip. Modern ultrasonic equipment can indeed differentiate between a real bare fingertip and a fake one by analyzing an ultrasonic cross section of the finger. Using ultrasonic sensor 906, an echographic cross-section of platen 104 and fingertip 102 is taken, which is then used to verify that fingertip 102 is real as indicated by the ultrasonic reflection of the bone. In addition, the ultrasonic sensor data can be used to verify that no material is placed between the fingertip and the platen such as, for example, a latex film copy of a fingerprint. The optically captured image of the fingerprint and the ultrasonic cross-section of the platen and fingertip combine to form a record of a user's identity which is extremely difficult to forge or simulate. Such an identity record provides a more powerful security measure than conventional fingerprint recognition technology.

Figure 11:
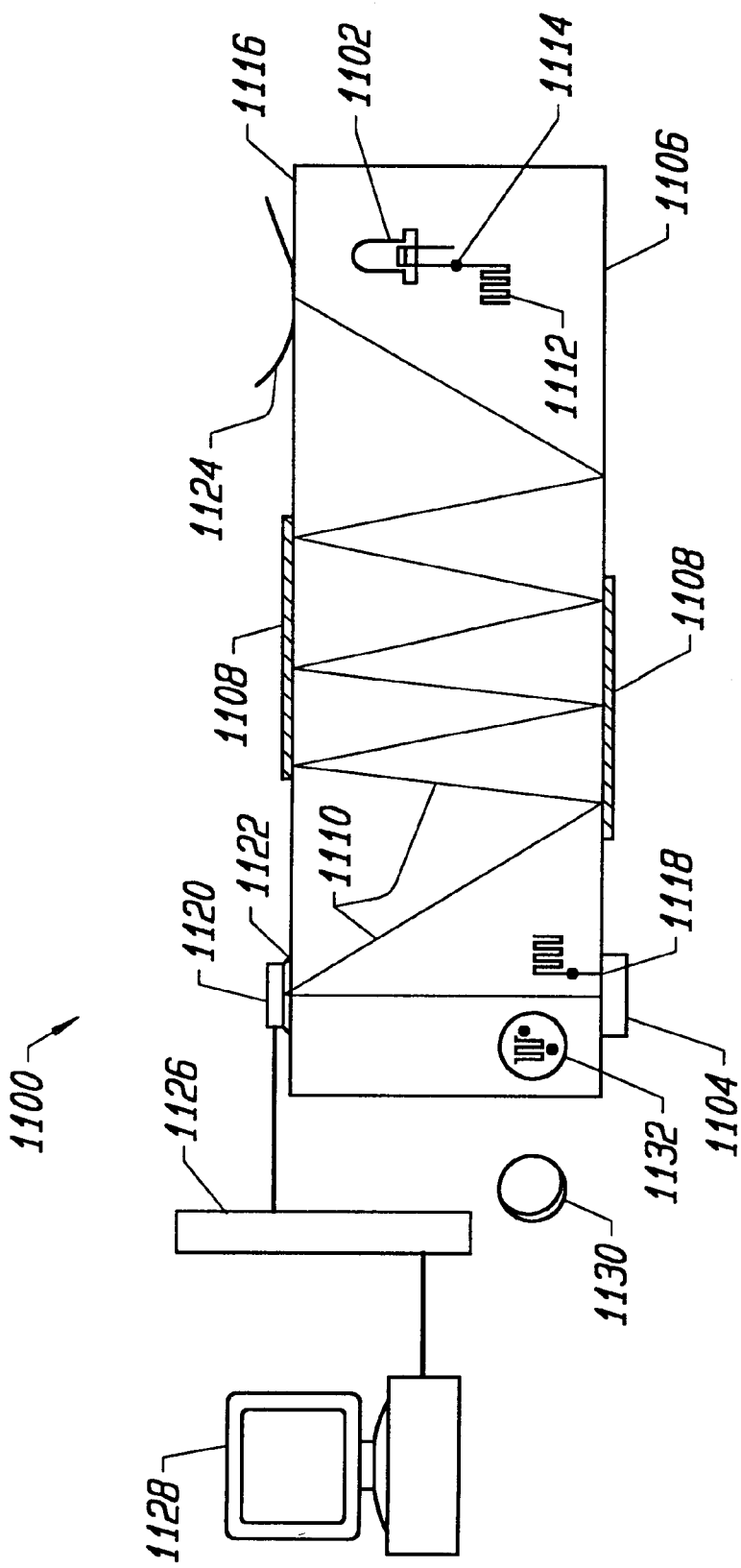
FIG. 11 is a block diagram of a specific embodiment of the invention.

The following specific embodiments relate to unique technical solutions which impact the manufacturability and cost efficiency of producing the pointing/control device of the present invention. These embodiments will be described with reference to control device 1100 of FIG. 11.

According to one specific embodiment, control device 1100 is a fully integrated unit including an LED 1102 and a image sensor 1104 mounted on a plastic block 1106 which serves as package, platen and lens. To achieve low manufacturing cost and high volume production throughput, all assembly steps are automated and no manual adjustments are necessary.

In some embodiments, the plastic block is partially coated with a metallic film which serves two purposes. In certain areas, the metallic film is used as a reflector 1108 to fold optical path 1110 inside plastic block 1106. In other areas, the metallic coating is used as the electrical interconnect for LED 1102 and image sensor 1104 in the form of traces 1112 and pads 1114 similar to those found in semiconductor packages.

In other embodiments, the plastic block as well as the metallic traces and pads deposited on the block are designed for a "flip-chip" mounting of the LED and the image sensor. Unlike conventional semiconductor assembly where lead bond wires connect the chip pads to the package pads which are positioned side by side, flip-chip assembly consists of flipping the chip around so as to position the chip pads and the package pads face to face. By placing a conductive material between the facing pads (e.g., an indium bump or a silver-filled epoxy bead), the electrical interconnect is achieved. In more specific embodiments, an epoxy preform is utilized which covers the entire image sensor chip. This epoxy preform is optically transparent over the photosensitive area of the image sensor and conductive only over the pad areas of the image sensor. By placing and curing the epoxy preform between the image sensor chip and the plastic block, one can achieve electrical, optical and mechanical connection in a simple and repeatable manufacturing step.

According to a specific embodiment, a manufacturing method is provided which corrects for variations in the optical characteristics of the injection molded components of the pointing/control device due to shrinkage variability. The method will be described with reference to FIG. 11. Current techniques for manufacturing optical devices using injected molded housings do not typically place the imaging sensor in contact with the housing because the location of the imaging plane tends to vary with the manner in which the housing cools. Instead, the position of the sensor with respect to the housing is mechanically adjusted after the housing has cooled sufficiently to ensure satisfactory image focus. By contrast, the present invention employs an injection molded plastic block 1106 with respect to which the object plane (i.e., platen surface 1116) and the image plane (i.e., image sensor mounting surface 1118) are fixed. That is, one of the surfaces of plastic block 1106 is the platen surface and image sensor 1104 is mounted to plastic block 1106. This allows for the assembly and bonding techniques described above. Because, according to this embodiment of the invention, the surface of the platen and the image sensor position are fixed, the image focus correction takes place in optical path 1110 between the object and image planes. Optical path 1110 is provided by a number of reflections of the light from LED 1102 from the internal surfaces of plastic block 1106. The reflections may be from a combination of metal-coated surfaces 1108 and total internal reflections from uncoated surfaces. All of the reflective surfaces are fixed with respect to plastic block 1106 except for one which comprises an external reflecting element 1120 the position of which may be mechanically adjusted with respect to block 1106. This is achieved in one embodiment by gluing reflective element 1120 (e.g., a polished piece of metal) to a surface of block 1106 in optical path 1110 which does not already have a metallic coating. Before the glue 1122 has cured, the correct position of the reflective element 1120 is determined by moving it until the platen surface and image sensor mounting surface are optically conjugated. According to one embodiment, optical conjugation is determined with respect to a three-dimensional test pattern 1124 placed against the platen of a preassembled device. The output of image sensor 1104 is monitored while the position of reflective element 1120 is manipulated until the image captured by sensor 1104 is focused and aligned. According to a specific embodiment, reflective element 1120 is temporarily attached to a motorized arm 1126 which is controlled by a computer 1128 which also processes the output of image sensor 1104 substantially in real time. The latitude of motion of the reflective element is determined by the amount of excess glue 1122 between element 1120 and the surface of block 1106. Glue 1122 is selected to have an optical index of refraction which closely matches the index of plastic block 1106. Glue 1122 is also selected to have a curing mechanism which may be accelerated by exposure to electromagnetic radiation, e.g., ultraviolet light. When the proper position of reflective element 1120 is determined, a powerful burst of ultraviolet light fixes the element's position nearly instantaneously. It will be understood that the above described manufacturing method may be performed entirely manually, or with varying degrees of automation and computer control.

According to yet another specific embodiment, plastic block 1106 and traces 1112 and pads 1114 are designed to accommodate a miniature battery 1130, e.g., a lithium wristwatch battery. In a more specific embodiment, the plastic block has a cavity 1132 into which battery 1130 can be inserted, the inside of which is coated with conductive traces 1112 and pads 1114 so as to provide the connection of battery 1130 with the rest of the circuitry, e.g., image sensor 1104 and other ancillary components. The purpose of battery 1130 is to provide power to the various circuits associated with image sensor 1104 or other peripheral components such as the memory circuit described below.

In another embodiment, image sensor 1104 or a peripheral memory chip 1134 records and stores data specific to device 1100. The data may include, for example, the device's serial number, encryption codes (as discussed above), and calibration data relative to the device's specific optical and electrical characteristics. Because of the automated nature of the assembly process and because no adjustments are provided, the optical and electrical characteristics (e.g., magnification, distortion, uniformity, gain, offset, etc.) of each device are different. These parameters are measured on the assembled device and corrected using a set of calibration coefficients. The calibration coefficients are then stored in a memory on the image sensor or in some other peripheral memory in the device. These data may be stored in some medium outside the device, e.g., a floppy disk, but having the calibration data of each device permanently stored within the device simplifies the distribution of the device because there is no need for an accompanying floppy disk. Moreover, this feature virtually guarantees that no devices will be operated with the wrong set of calibration data.

According to a more specific embodiment, the data discussed above with reference to FIG. 11 are generated and stored during the testing of the device in the factory. The data are then read each time the device is operated. In addition, the memory which stores the information, whether on the image sensor or separate therefrom, has some important security features which prevent tampering. First, the data stored in the memory may only be loaded once, i.e., the memory cannot be rewritten. In one embodiment, this is achieved using random access memory (RAM) in which fuses in the write lines are blown after the data are loaded, thereby disabling any prospective write capability. Second, the memory used to store the data is a volatile memory. Thus, if power to the memory is lost, e.g., the integrated battery is disconnected, the data in the memory are lost and cannot be reloaded.

Figure 12:
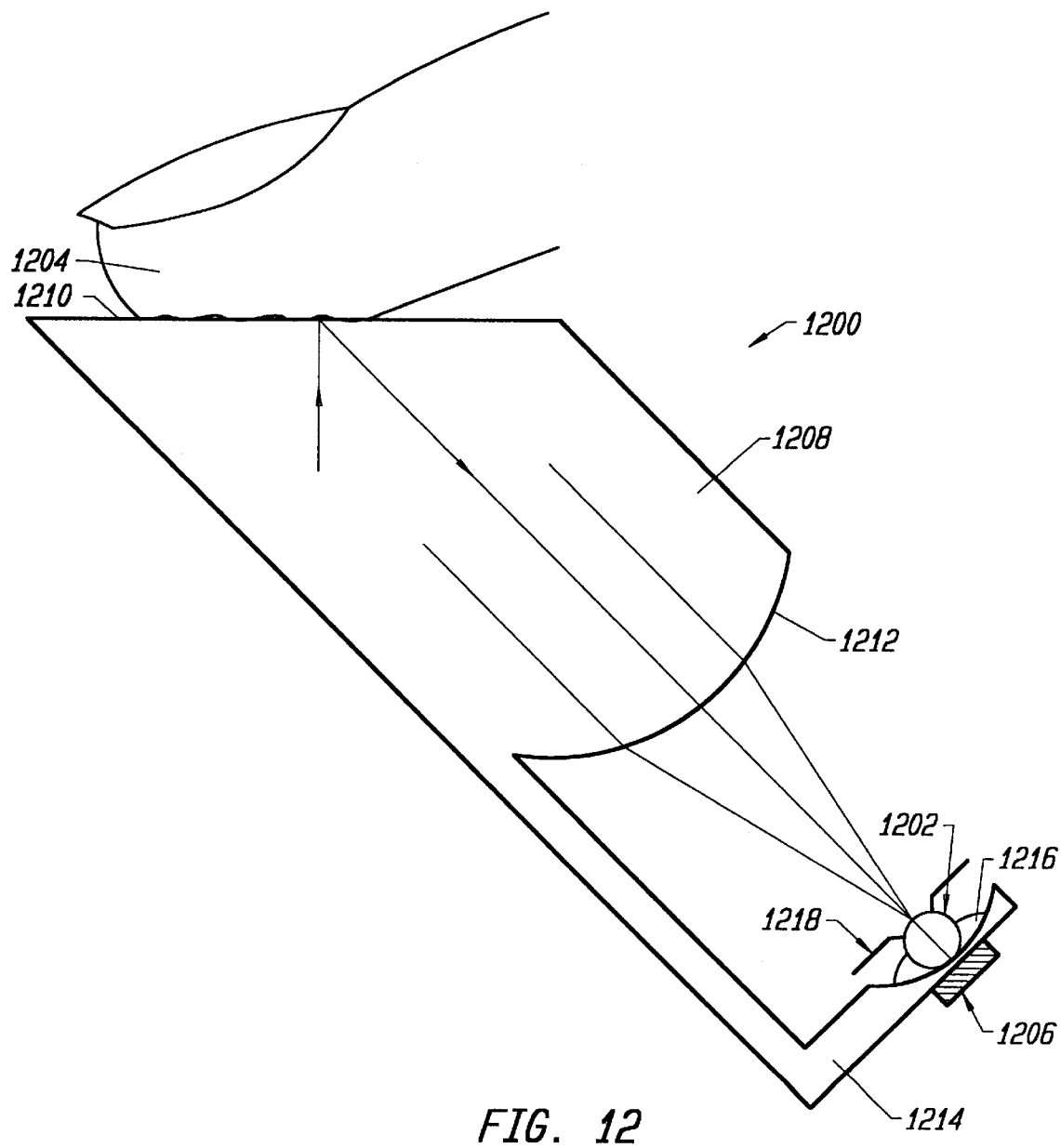
FIG. 12 is a simplified diagram of another specific embodiment of the invention.

FIG. 12 shows another embodiment of the invention (control device 1200) in which the position of a refractive optical element 1202 is manipulated to bring an image of fingertip 1204 into focus and proper alignment on detector 1206. In the embodiment shown, optical element 1202 comprises a so-called "microsphere" which is a glass sphere having a diameter of approximately 2 mm. Glass microspheres have the advantage over plastic lenses in that they do not experience shrinkage problems and can therefore maintain greater surface quality than molded plastic, i.e., $<\lambda/2$. Moreover, unlike most glass optical elements, such microspheres may be manufactured inexpensively using largely automated mass production techniques. Therefore, high quality optical imaging may be achieved with the present invention for a very low cost.

Referring again to FIG. 12, control device 1200 comprises a plastic housing 1208 including platen surface 1210 (which is coincident with the object plane), aspherical surface 1212, and mounting arm 1214 upon which microsphere 1202 and detector 1206 are mounted. In the embodiment shown, the volume between aspherical surface 1212 and mounting arm 1214 contains air, but may contain a variety of mediums. As discussed above with respect to other embodiments, only light transmitted beyond the critical angle of the housing material is directed toward microsphere 1202 and received by detector 1206. As with the embodiment of FIG. 11, the optical element, i.e., microsphere 1202, is affixed to the housing (mounting arm 1214) with epoxy 1216. However, in the embodiment of FIG. 12, microsphere 1202 is mounted in a substantially hemispherical cavity 1218 in mounting arm 1214. The diameter of the cavity is larger than that of microsphere 1202, thus providing latitude for optimal positioning of microsphere 1202 as well as space for excess epoxy 1216. Before epoxy 1216 hardens, the position of microsphere 1202 is manipulated until the image of fingertip 1204 (or any suitable test pattern) is properly focused and aligned with detector 1206. An aperture stop 1220 may be provided on microsphere 1202 to prevent any undesired light from impinging upon detector 1206. As with the embodiment of FIG. 11, the manipulation of microsphere 1202 may be under computer control, and the hardening of epoxy 1216 may be accelerated using exposure to radiation, e.g., ultraviolet light.

Control device 1200 provides additional advantages in that there are very few reflections/refractions in the optical path. This results in a high image quality (because the degradation encountered with a large number of reflections/refractions is avoided), and a suitably small housing (because the optical path is short). Moreover, the optical elements in the optical path, i.e., microsphere 1202 and aspherical surface 1212, combine to form a telecentric lens system which corrects for viewing angle error, thus maintaining uniform image quality over the entire platen area. Viewing angle error is due to the fact that fingertip 1204 on platen 1210 must be viewed from beyond the critical angle of the platen material. Without appropriate correction, the image at detector 1206 would be affected by perspective distortion.

As is well known, telecentric lens systems are employed in a variety of applications, e.g., video lenses, to correct for such viewing angle error. However, commercially available telecentric lens systems are typically too expensive and/or cumbersome to incorporate in such a design. In contrast, the telecentric lens system described herein is inexpensive and relatively easy to incorporate into the control device of the present invention. In addition, because only two refractions are necessary in control device 1200 (i.e., plastic to air and air to glass), the image quality remains high and the device is relatively small.

Figure 13:
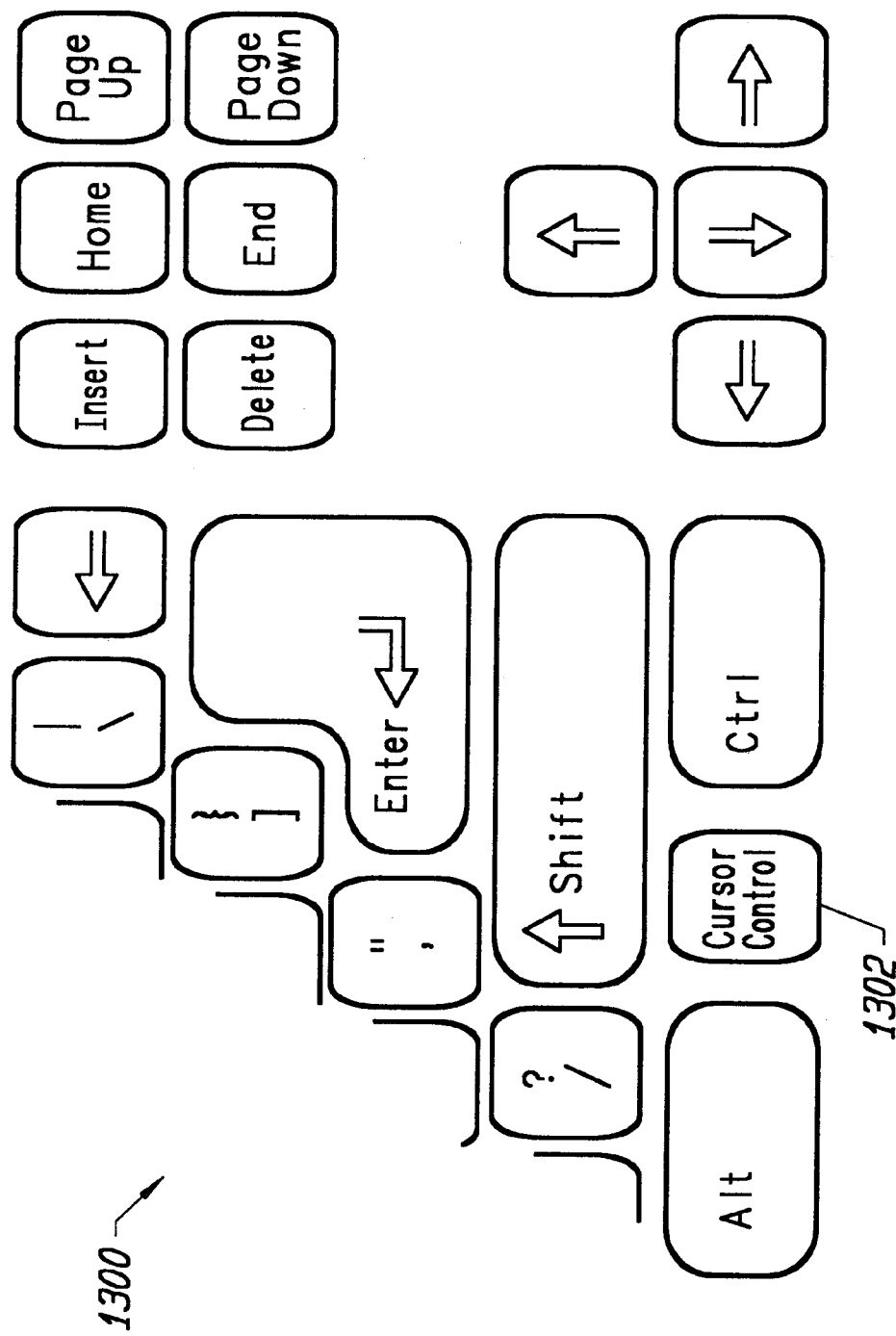
FIG. 13 is a partial view of a computer keyboard into which the pointing device of the present invention has been incorporated.

According to another specific embodiment, the plastic block is designed with the platen area protruding from the block and shaped like a conventional computer keyboard key. This feature allows the device to be fully integrated into a standard keyboard 1300, occupying the space of a single key 1302 as shown in FIG. 13.

Other specific embodiments relate to the form factor of a fingerprint capture device designed according to the invention. More specifically, some embodiments of the fingerprint capture device have the shape of and are held like a writing implement, e.g., a pen. The active area of the device with which the user's fingertip maintains contact is located near the base, i.e., the writing end, of the device in a position where the user's index finger makes contact with the device when it is held in its most comfortable position. Alternatively, the active area of the device is positioned such that it makes contact with the thumb. As will be described, the elongated pen-shaped form factor is particularly suitable for the telecentric optical design discussed above with reference to FIG. 12. However, it will be understood that the pen-shaped form factor may be employed with other optical designs or other fingerprint capture methods such as, for example, electric field sensitive devices, i.e., direct contact chip technology.

Figure 14:
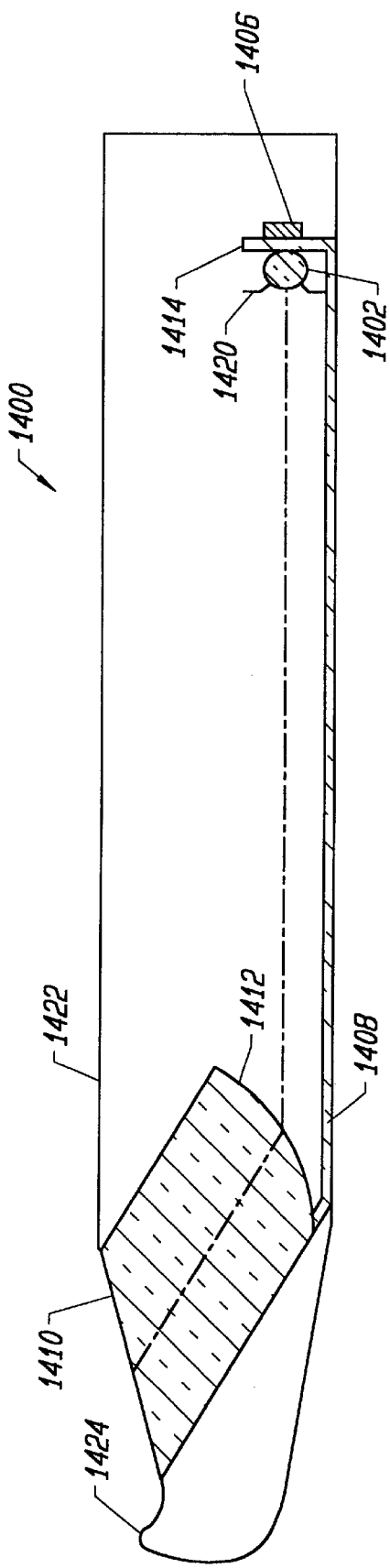
FIG. 14 is a longitudinal cross-section of an embodiment having a pen-shaped form factor.

FIG. 14 is a cross-section of an optical fingerprint capture device 1400 having a form factor like a writing implement, e.g., a large fountain pen. The optical system of device 1400 is similar to the telecentric lens system of FIG. 12 and comprises a plastic structure 1408 including platen surface 1410, aspherical surface 1412, and mounting arm 1414 upon which microsphere 1402 and detector 1406 are mounted. In a specific embodiment, surface 1412 comprises an off-axis elliptical surface. As discussed above with respect to other embodiments, only light transmitted beyond the critical angle of the platen material is directed toward microsphere 1402 and received by detector 1406. An aperture stop 1420 may be provided on microsphere 1402 to prevent any undesired light from impinging upon detector 1406. The optical system is enclosed within a device housing 1422 in such a way that platen surface 1410 makes up part of the substantially conical portion of housing 1422. The location of platen surface 1410 on housing 1422 coincides with the position at which a user's index fingertip contacts when the user is comfortably holding the device as she would a writing implement. As shown, microsphere 1402 and detector 1406 are positioned in the substantially cylindrical portion of housing 1422. Device 1400 may optionally include a lip 1424 or some other structural feature which facilitates optimal positioning of a fingertip on platen surface 1410.

The pen-shaped form factor described above provides a number of ergonomic and technical advantages over traditional fingerprint capture devices. Currently available fingerprint capture devices typically have an active area which is rigidly mounted in a solid, stationary housing to provide support for the application of fingertip pressure by the user. Even so, users often do not apply sufficient pressure on the active area. In addition, because of the awkward hand position typically required to apply pressure to a traditional fingerprint capture device, users often do not keep their finger on the device long enough to achieve sufficiently intimate contact between the fingertip and the active area. In some cases, this intimate contact may take several seconds to achieve because of the capillarity effect of the skin oil on the fingertip.

In contrast, the pen-shaped form factor of the present invention and the positioning of the active area facilitate sufficiently lengthy and intimate contact between the user's fingertip and the active area. This is due to the fact that, because of its shape, users have an intuitive understanding of how to comfortably hold the device, thereby automatically placing the user's fingertip (or thumb) directly on the active area. Moreover, because users are accustomed to holding a pen firmly for extended periods of time, sufficient contact between the fingertip and active area may be achieved more easily.

In addition, because the fingerprint capture device of the present invention is shaped like a writing implement, one of its uses may be directly analogized to the use of an actual writing implement for the purpose of affixing one's signature on paper. That is, not only may the invention be used for identification purposes, it may also be used to capture a fingerprint signature for the purpose of conducting secure financial or other business transactions over the Internet. Moreover, the form factor of the present invention provides a more appealing and familiar shape for this function than the bulky and inconvenient shapes of other fingerprint capture devices, some of which are likely to evoke unpleasant mental images in the mind of the average user relating to the criminal justice system.

Figure 15:
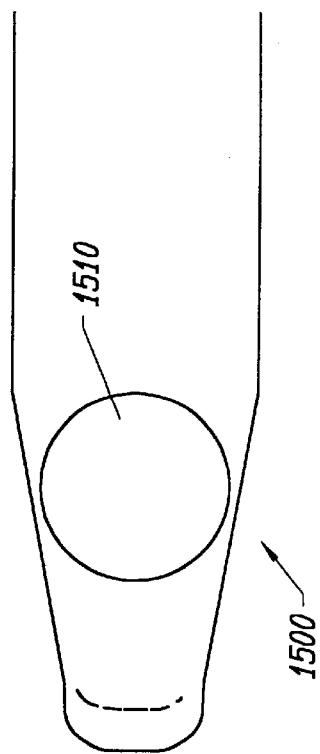
FIG. 15 is a top view of an embodiment having a pen-shaped form factor showing the active/platen area.

With regard to technical advantages, the elongated dimensions of the device of the present invention, allow for an optical path from the platen to the detector with no reflections. Not only is such a design extremely simple, it may also achieve better performance than embodiments in which the optical path is folded, e.g., by reflection, because of the image degradation associated with such complex optical paths. Moreover, if a telecentric optical design is implemented with the pen-shaped form factor, a viewing angle much greater than the critical angle may be employed because of the correction for perspective distortion provided by the telecentric lens system as shown. With such a large viewing angle, the platen or active area may be positioned in the conical section of the device, i.e., where the index finger is typically placed, with the other optical and electronic components being placed in the cylindrical section of the device (see FIG. 14). FIG. 15 is a particular view of a fingerprint capture device 1500 in which the shape of the platen or active area 1510 can easily be seen. As shown, a circular active area 1510 is employed which is easier to implement in a pen-shaped device than the traditional rectangular active area and offers equally good performance. Alternatively, an elliptical active area may also be employed.

According to more specific embodiments, the platen active area may have a slightly convex shape to better match the curvature of the device's conical surface. It even turns out in some cases that the slightly convex shape of such a platen helps correct certain optical aberrations of the optical system known as field curvature aberrations. This, in turn, can provide better focus uniformity between the center and the edge of the field of view.

While the invention has been particularly shown and described with reference to specific embodiments thereof, it will be understood by those skilled in the art that the foregoing and other changes in the form and details may be made therein without departing from the spirit or scope of the invention. For example, in addition to providing a fingerprint capture capability, the pen-shaped embodiment of FIGS. 14 and 15 may also provide additional functionality such as a writing capability by including a writing implement within the housing. Alternatively, a pointing capability, e.g., such as with a light pen or similar device, may be provided by including pointing device electronics within the housing. The scope of the invention should therefore be determined by reference to the appended claims.

What is claimed is:

1. An apparatus for generating a control signal for controlling movement of a first object, the control signal corresponding to movement of a second object in contact with a first surface, the apparatus also being for generating image data representative of the second object, the apparatus comprising:

a platen comprising the first surface;

a source of electromagnetic radiation for emitting electromagnetic radiation through the platen which is diffused by the second object;

a lens for transmitting a portion of the electromagnetic radiation;

a detector for receiving the portion of the electromagnetic radiation and generating charge in response thereto; and conversion circuitry for converting the charge generated in the detector to the control signal in a first mode of operation, the conversion circuitry also being for generating the image data from the charge generated in the detector in a second mode of operation, the control signal representing a speed and a direction of movement of the first object in the first mode of operation.

2. The apparatus of claim 1 wherein the lens comprises a microsphere lens.

3. The apparatus of claim 1 wherein the detector comprises a photodetector array having a first plurality of pixels, the first plurality of pixels being configurable to form a plurality of sectors.

4. The apparatus of claim 3 wherein the first plurality of pixels are configurable to form four sectors each of which comprises a quadrant of the detector.

5. The apparatus of claim 3 wherein the first plurality of pixels are configurable to generate charge corresponding to a high resolution image of the object.

6. The apparatus of claim 3 wherein the first plurality of pixels are configurable in the first mode of operation to form a first number of sectors, each sector having an output associated therewith, the plurality of pixels also being configurable in the second mode of operation to form a single imaging array having a single output associated therewith.

7. The apparatus of claim 3 wherein the photodetector array is implemented in a single silicon substrate, the apparatus further comprising encryption circuitry for encrypting the charge generated in the photodetector array, the encryption circuitry being implemented in the single silicon substrate with the photodetector array.

8. The apparatus of claim 3 wherein the photodetector array is implemented in a single silicon substrate, the apparatus further comprising a computer interface, the computer interface being implemented in the single silicon substrate with the photodetector array.

9. The apparatus of claim 3 wherein the photodetector array is implemented in a single silicon substrate, the apparatus further comprising an analog-to-digital converter and an external input port for injecting signals into the analog-to-digital converter, the external input port and the analog-to-digital converter being implemented in the single silicon substrate with the photodetector array.

10. The apparatus of claim 1 wherein the second object comprises a fingertip and the control signal is for controlling movement of a pointer on a display in response to the movement of the fingertip on the platen, and wherein the conversion circuitry comprises an analog-to-digital converter and a serial data interface to facilitate compatibility with a computer serial data port.

11. The apparatus of claim 10 wherein the conversion circuitry is further operable to generate a selection signal in response to a sequence of intermittent contacts between the fingertip and the platen, the selection signal being for selecting an item on the display indicated by the pointer.

12. The apparatus of claim 10 further comprising an ultrasonic sensor for taking an echographic cross-section of the fingertip, the echographic cross-section comprising data indicating whether the fingertip is a live human fingertip.

13. The apparatus of claim 1 wherein the detector and the source of electromagnetic radiation are integrated with an injection molded plastic housing comprising the platen.

14. The apparatus of claim 13 wherein the housing further comprises the lens.

15. The apparatus of claim 1 wherein the source of electromagnetic radiation comprises at least one light emitting diode.

16. The apparatus of claim 1 wherein the source of electromagnetic radiation is positioned with respect to the platen such that only the electromagnetic radiation diffused by the second object beyond the critical angle impinges upon the detector.

17. The apparatus of claim 1 wherein the source of electromagnetic radiation is positioned with respect to the platen such that the electromagnetic radiation internally reflects from the platen and impinges upon the detector.

18. The apparatus of claim 1 further comprising a memory for storing data specific to the apparatus.

19. The apparatus of claim 18 wherein the detector and the memory are implemented in a single silicon substrate, and the memory comprises memory which may be configured so that it may not be rewritten.

20. The apparatus of claim 18 wherein the detector and the memory are implemented in a single silicon substrate, and the memory comprises volatile memory.

21. The apparatus of claim 1 wherein the second object defines an area of contact with the platen, the apparatus further comprising means for determining whether the size of the area of contact exceeds a threshold.

22. The apparatus of claim 1 wherein the first surface of the platen has an object plane associated therewith, and the detector has an image plane associated therewith, there being an optical path between the object plane and image plane, the apparatus further comprising a housing within which the detector is enclosed, the housing having an internal surface through which the optical path passes, the internal surface and the lens being part of a demagnifying telecentric lens system.

23. An apparatus for generating image data representative of an object in contact with a first surface, comprising:
   a platen comprising the first surface;
   a source of electromagnetic radiation for emitting electromagnetic radiation through the platen which is diffused by the object;
   a microsphere lens for transmitting a portion of the electromagnetic radiation;
   a detector for receiving the portion of the electromagnetic radiation and generating charge in response thereto, the detector being implemented in a single semiconductor substrate; and circuitry for generating the image data from the charge generated in the detector, the circuitry being implemented in the single semiconductor substrate with the detector; wherein the microsphere lens is fixed with respect to the detector using an adhesive material having a first index of refraction which is substantially the same as a second index of refraction associated with the microsphere lens.

24. The apparatus of claim 23 wherein the circuitry comprises a computer port interface.

25. The apparatus of claim 23 wherein the circuitry comprises encryption circuitry for encrypting the image data.

26. The apparatus of claim 23 wherein the circuitry comprises memory for storing the image data.

27. The apparatus of claim 23 wherein the circuitry comprises an analog-to-digital converter.

28. The apparatus of claim 23 wherein the circuitry comprises an external signal input port for injecting signals into the analog-to-digital converter.

29. The apparatus of claim 23 wherein the circuitry comprises security circuitry which limits access to the image data.

30. An apparatus for generating image data representative of an object in contact with a surface, comprising:
   a platen comprising the surface;
   electronic circuitry for generating an image of the object using the platen;
   a microsphere lens for transmitting the image generated by the electronic circuitry and the platen; and
   a detector for receiving the image via the microsphere lens and generating charge corresponding to the image data in response thereto;

wherein the microsphere lens is fixed with respect to the detector using an adhesive material having a first index of refraction which is substantially the same as a second index of refraction associated with the microsphere lens.

31. An apparatus for generating a control signal for controlling movement of a first object, the control signal corresponding to movement of a second object in contact with a first surface, the apparatus also being for generating image data representative of the second object, the apparatus comprising:

a platen comprising the first surface;

electronic circuitry for generating an image of the second object using the platen;

a lens for transmitting the image generated by the electronic circuitry and the platen;

a detector for receiving the image from the lens and generating charge in response thereto; and conversion circuitry for converting the charge generated in the detector to the control signal in a first mode of operation, the conversion circuitry also being for generating the image data from the charge generated in the detector in a second mode of operation, the control signal representing a speed and a direction of movement of the first object in the first mode of operation.

32. An apparatus for generating a control signal for controlling movement of a first object, the control signal corresponding to movement of a second object in contact with a first surface, the apparatus also being for generating image data representative of the second object, the apparatus comprising:

a platen comprising the first surface; and electronic circuitry for generating the control signal using the platen in a first mode of operation, the electronic circuitry also being for generating the image data using the platen in a second mode of operation, the control signal representing a speed and a direction of movement of the first object in the first mode of operation.

33. An apparatus for capturing an image of a fingertip, comprising:

a fingerprint capture device having a platen for contacting the fingertip, the fingerprint capture device also including a microsphere lens for demagnifying the image of the fingertip, and an image sensor for generating charge corresponding to the image of the fingertip; and a housing having a shape of a hand-held writing implement enclosing the fingerprint capture device, the housing having an aperture through which the fingertip contacts the platen;

wherein the microsphere lens is fixed with respect to the image sensor using an adhesive material having a first index of refraction which is substantially the same as a second index of refraction associated with the microsphere lens.

34. The apparatus of claim 33 wherein the fingerprint capture device comprises a demagnifying telecentric lens system.

35. The apparatus of claim 34 wherein an optical path between the platen and the image sensor is shaped without reflective elements.

36. The apparatus of claim 33 wherein the platen is substantially circular.

37. The apparatus of claim 33 wherein the platen is elliptical.

38. The apparatus of claim 33 wherein the platen is convex.

39. The apparatus of claim 33 wherein the housing comprises a conical section and a cylindrical section, the aperture being in the conical section.

40. The apparatus of claim 33 wherein the platen has a critical angle associated therewith beyond which light incident on the platen is not transmitted, and wherein a surface of the platen is characterized by a convexity as a result of which an optical path between the platen and the image sensor lies substantially beyond the critical angle.

41. The apparatus of claim 33 further comprising a writing implement enclosed within the housing.

42. The apparatus of claim 33 further comprising pointing device electronics enclosed within the housing.

43. The apparatus of claim 33 wherein the housing comprises a structural device which facilitates positioning the fingertip on the platen.

44. The apparatus of claim 33 wherein the lens comprises a microsphere lens.

45. A method for providing an electronic equivalent of a signature, comprising the steps of:

providing an apparatus comprising a fingerprint capture device having a platen, a demagnifying microsphere lens, and an image sensor wherein the microsphere lens is fixed with respect to the image sensor using an adhesive material having a first index of refraction which is substantially the same as a second index of refraction associated with the microsphere lens, the apparatus further comprising a housing having a shape of a hand-held writing implement enclosing the fingerprint capture device, the housing having an aperture;

capturing an image of a user's fingertip in contact with the platen through the aperture using the fingerprint capture device;

converting the image to electronic information with the image sensor; and employing the electronic information as the electronic equivalent of the signature.

46. The method of claim 45 wherein the demagnifying lens comprises a microsphere lens.

47. An apparatus for generating image data representative of an object in contact with a first surface, comprising:

a platen comprising the first surface and a second surface;

a source of electromagnetic radiation for emitting electromagnetic radiation through the platen which is diffused by the object;

a microsphere lens for transmitting a portion of the electromagnetic radiation;

a detector for receiving the portion of the electromagnetic radiation and generating charge in response thereto, the detector being implemented in a single semiconductor substrate; and circuitry for generating the image data from the charge generated in the detector, the circuitry being implemented in the single semiconductor substrate with the detector;

wherein the microsphere lens and the second surface form a telecentric lens system.

48. The apparatus of claim 47 wherein the circuitry comprises a computer port interface.

49. The apparatus of claim 47 wherein the circuitry comprises encryption circuitry for encrypting the image data.

50. The apparatus of claim 47 wherein the circuitry comprises memory for storing the image data.

51. The apparatus of claim 47 wherein the circuitry comprises an analog-to-digital converter.

52. The apparatus of claim 47 wherein the circuitry comprises an external signal input port for injecting signals into the analog-to-digital converter.

53. The apparatus of claim 47 wherein the circuitry comprises security circuitry which limits access to the image data.

54. An apparatus for generating image data representative of an object in contact with a first surface, comprising:
- a platen comprising the first surface and a second surface;
- electronic circuitry for generating an image of the object using the platen;
- a microsphere lens for transmitting the image generated by the electronic circuitry and the platen; and
- a detector for receiving the image via the microsphere lens and generating charge corresponding to the image data in response thereto;
- wherein the microsphere lens and the second surface form a telecentric lens system.

55. An apparatus for capturing an image of a fingertip, comprising:
- a fingerprint capture device having a platen for contacting the fingertip wherein the platen includes a surface, the fingerprint capture device also including a microsphere lens for demagnifying the image of the fingertip, and an image sensor for generating charge corresponding to the image of the fingertip; and
- a housing having a shape of a hand-held writing implement enclosing the fingerprint capture device, the housing having an aperture through which the fingertip contacts the platen;
- wherein the microsphere lens and the surface form a telecentric lens system.

56. The apparatus of claim 55 wherein an optical path between the platen and the image sensor is shaped without reflective elements.

57. The apparatus of claim 55 wherein the platen is substantially circular.

58. The apparatus of claim 55 wherein the platen is elliptical.

59. The apparatus of claim 55 wherein the platen is convex.

60. The apparatus of claim 55 wherein the housing comprises a conical section and a cylindrical section, the aperture being in the conical section.

61. The apparatus of claim 55 wherein the platen has a critical angle associated therewith beyond which light incident on the platen is not transmitted, and wherein the surface of the platen is characterized by a convexity as a result of which an optical path between the platen and the image sensor lies substantially beyond the critical angle.

62. The apparatus of claim 55 further comprising a writing implement enclosed within the housing.

63. The apparatus of claim 55 further comprising pointing device electronics enclosed within the housing.

64. The apparatus of claim 55 wherein the housing comprises a structural device which facilitates positioning the fingertip on the platen.

65. A method for providing an electronic equivalent of a signature, comprising the steps of:
- providing an apparatus comprising a fingerprint capture device having a platen wherein the platen includes a first surface and second surface, a demagnifying microsphere lens, and an image sensor, wherein the microsphere lens and the second surface form a telecentric lens system, the apparatus further comprising a housing having a shape of a hand-held writing implement enclosing the fingerprint capture device, the housing having an aperture;
- capturing an image of a user's fingertip in contact with the first surface of the platen through the aperture using the fingerprint capture device;
- converting the image to electronic information with the image sensor; and
- employing the electronic information as the electronic equivalent of the signature.

* * * * *

UNITED STATES PATENT AND TRADEMARK OFFICE
CERTIFICATE OF CORRECTION

| | | |
|---|---|---|
| PATENT NO. | : 6,166,370 | Page 1 of 1 |
| DATED | : December 26, 2000 | |
| INVENTOR(S) | : Sayag | |

Figure 16:
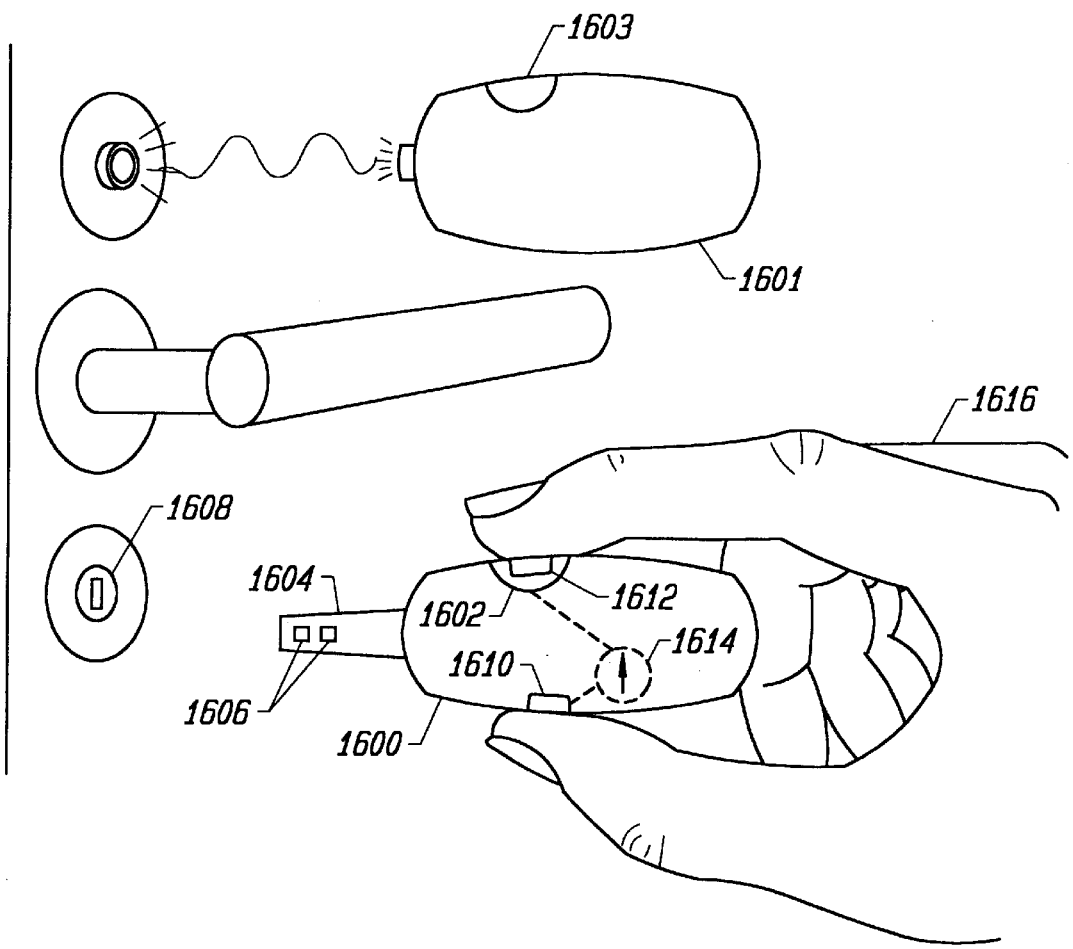
FIG. 16 is a further embodiment of the invention.

It is certified that error appears in the above-identified patent and that said Letters Patent is hereby corrected as shown below:

Please delete drawings sheet 11 of 11, FIG. 16.

Column 5,
Line 12, please delete "FIG. 16 is a further embodiment of the invention".

Signed and Sealed this

Twenty-fifth Day of September, 2001

Attest:

*Nicholas P. Godici*

NICHOLAS P. GODICI
*Acting Director of the United States Patent and Trademark Office*

*Attesting Officer*